May 23, 1933.    R. R. DICKERSON    1,910,885
TOAST BUTTERING DEVICE
Filed June 23, 1930    3 Sheets-Sheet 1
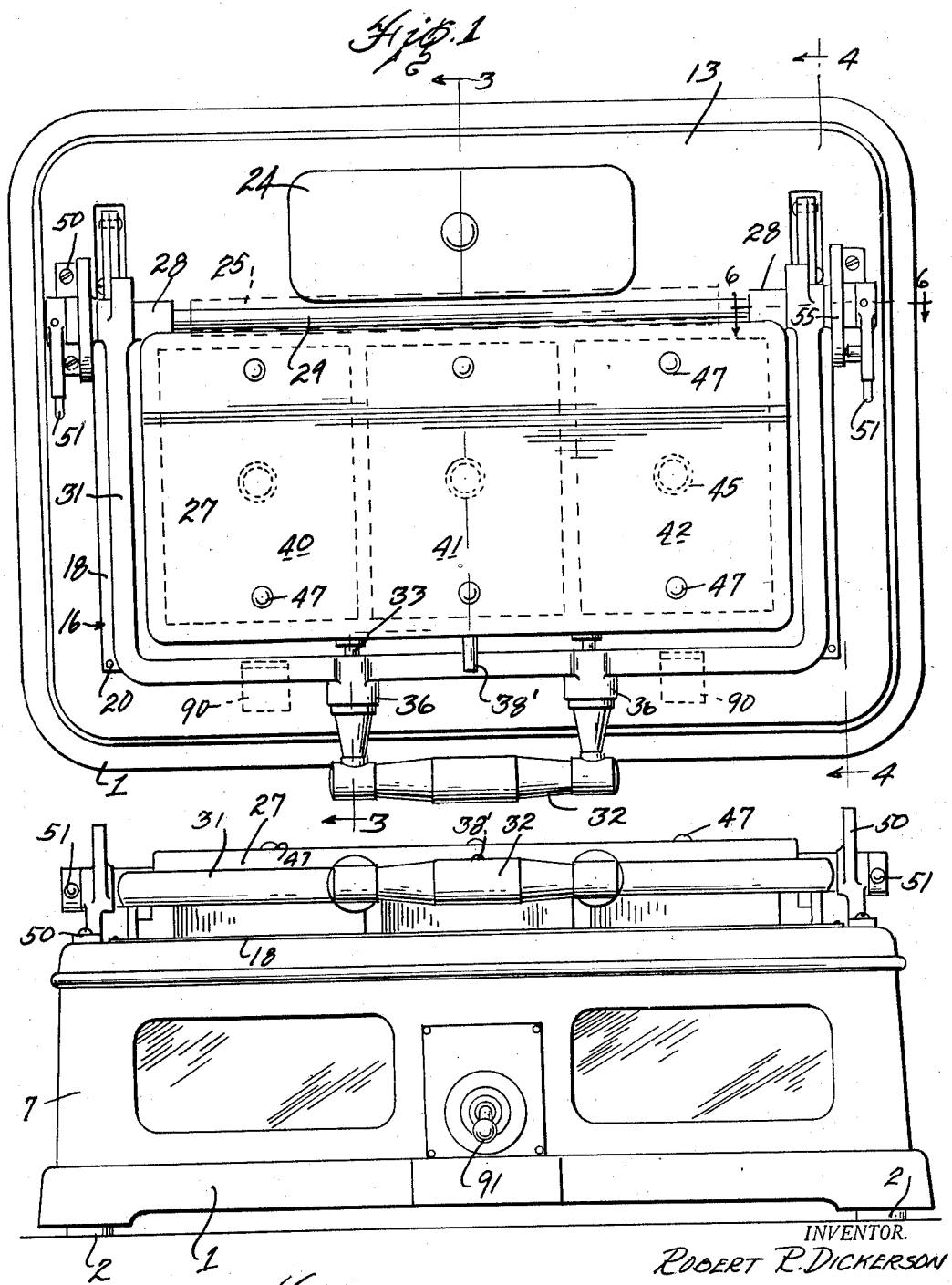
INVENTOR.
ROBERT R. DICKERSON
BY
ATTORNEY.

May 23, 1933.  R. R. DICKERSON  1,910,885
TOAST BUTTERING DEVICE
Filed June 23, 1930   3 Sheets-Sheet 2
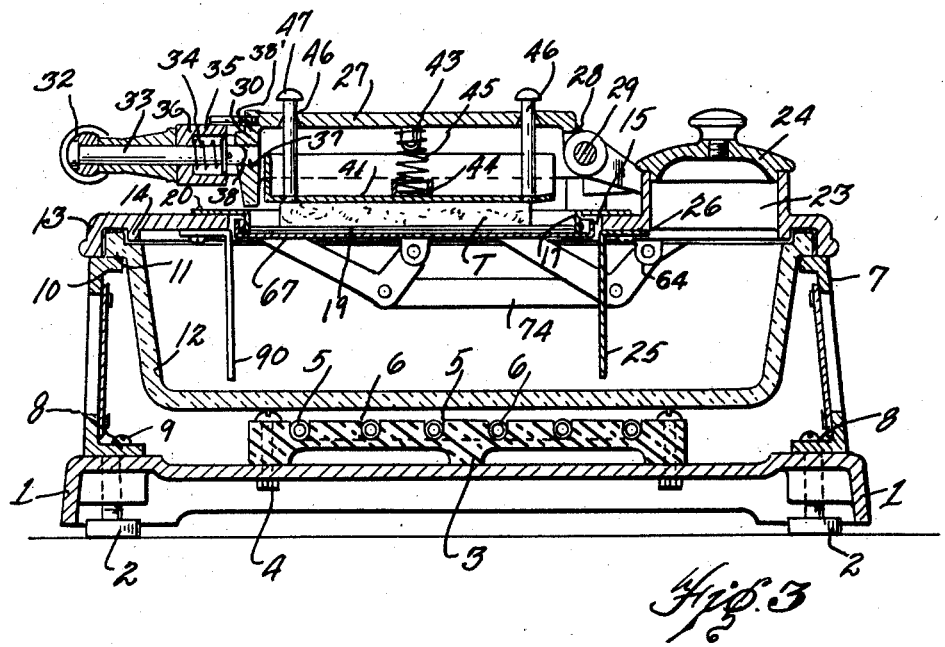
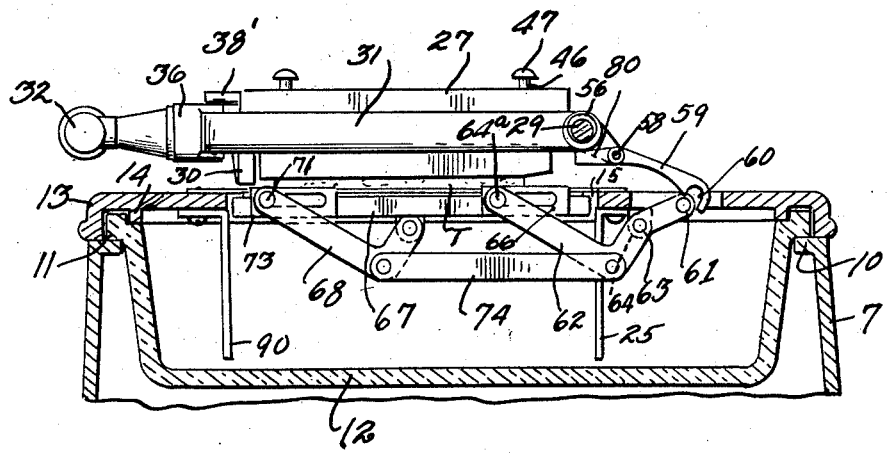
INVENTOR.
ROBERT R. DICKERSON
BY
ATTORNEY.

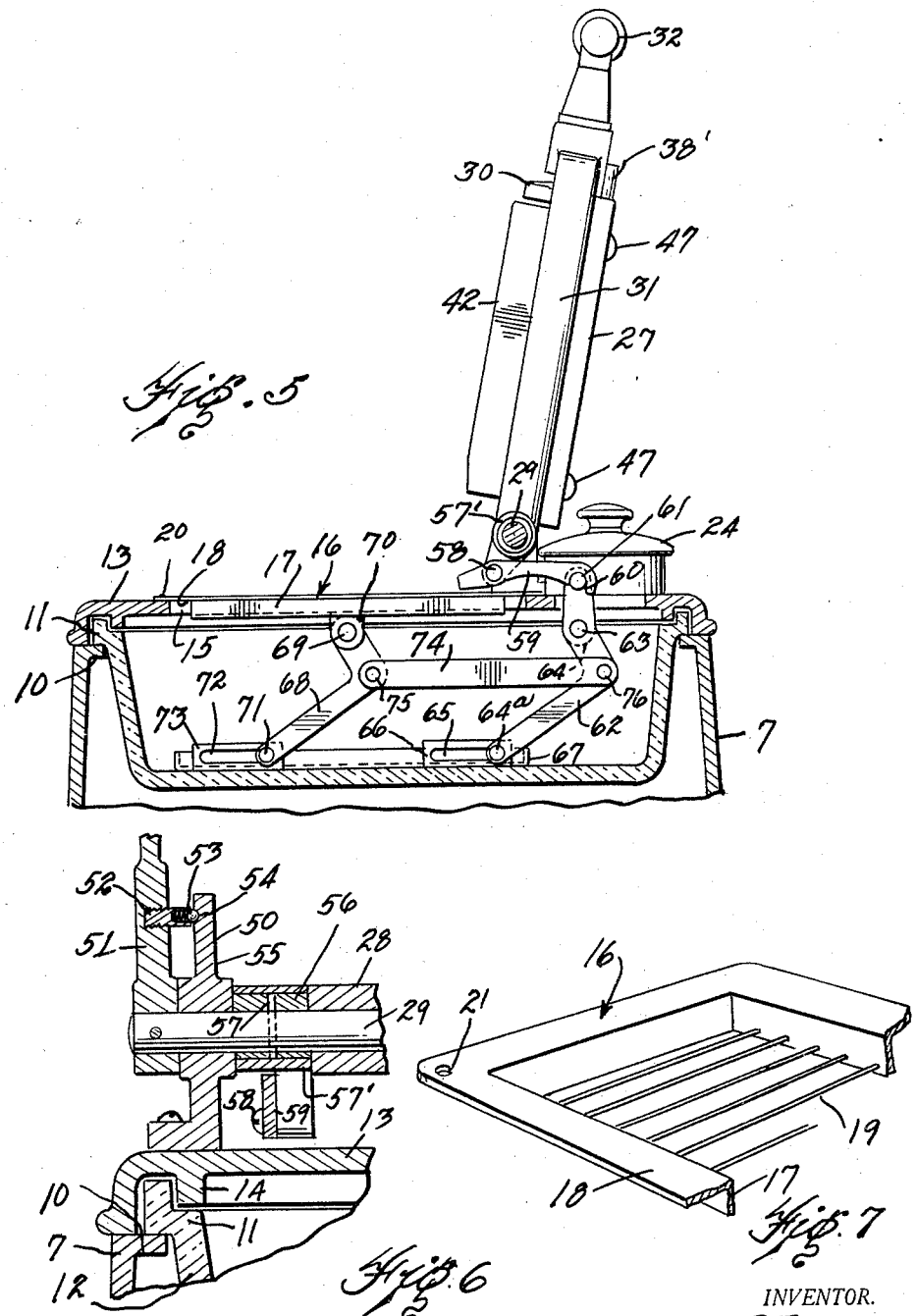

Patented May 23, 1933

1,910,885

UNITED STATES PATENT OFFICE

ROBERT R. DICKERSON, OF YPSILANTI, MICHIGAN

TOAST BUTTERING DEVICE

Application filed June 23, 1930. Serial No. 463,341.

This invention relates to a device for buttering toast or other similar articles of food.

An object of this invention is the provision of a comparatively cheap and simple device that will apply a predetermined amount of butter to one side of a slice of toast or bread, by the manipulation of a handle.

Another object of the invention is to provide a device of this character in which slices of bread or toast of varying thicknesses may be placed and an equal amount of butter applied to one face of the several slices of the same.

In making toast from slices of bread the surface of the toast as a rule is warped. It is therefore an object of this invention to provide a grill on which one face of the toast may rest and a cover member that may be brought down into contact with the upper face so that sufficient pressure may be applied to the toast to cause the lower face to become flat so that when a tray of melted butter is brought into contact with the lower face of the toast a quantity of butter will be applied to one side of the same in a uniform amount.

Another object of the invention is to provide a means for regulating the distance that the tray containing the melted butter will travel toward the side of a piece of toast to which the butter is to be applied, thus varying the amount of butter applied thereto as desired.

Another object of the invention is to provide a means that will limit the time in which the tray containing melted butter may be kept in contact with the toast to be buttered.

These objects and the several novel features of the invention are hereinafter more fully described and claimed and the preferred form of construction by which these objects are attained is shown in the accompanying drawings in which—

Fig. 1 is a top plan view of my improved device.

Fig. 2 is a front elevation thereof.

Fig. 3 is a section taken substantially on line 3—3 of Fig. 1.

Fig. 4 is a section taken on line 4—4 of Fig. 1.

Fig. 5 is a similar view showing the cover in the raised position and the tray in the lowered position.

Fig. 6 is an enlarged detail sectional view taken on line 6—6 of Fig. 1 and showing a means for regulating the height to which the tray containing melted butter may be raised.

Fig. 7 is a detail perspective of one end of the grill.

Referring now to the drawings, a base 1 is provided with the adjustable feet 2. An insulated plate 3 is secured to the upper face of the base 1 by means of the bolts 4 and is provided on its upper face with the grooves 5 for receiving a suitable heating element 6 therein.

A rectangular box like member 7 having an inturned flange 8 at its lower edge is also secured to the base 1 by means of the screws 9. The upper edge of the member 7 is provided with the inturned flange 10 on which the outturned flange 11 of the dish 12 rests. It will be seen by reference to Fig. 3 that the lower face of the dish 12 is in close proximity to the heating element 6 so that the heat from the same will be applied to the dish to keep the butter therein in melted condition. A lid 13 also rests upon the shoulder 10 and is formed with a rib 14, the same fitting in a recess formed in the upper edge of the dish 12. By this arrangement of the parts the splashed butter occasioned by the lowering of the tray thereinto does not pass out between the lid and dish. The lid 13 is formed with an aperture 15 and a rectangular grill 16 is provided with a downturned flange 17 and the outturned flange 18. Suitable wires 19 are secured to the lower edge of the flange 17 and form a grill on which the toast or bread may be laid to be buttered. It will be seen by reference to Fig. 3 that the downturned flange 17 of the grill 16 extends into the aperture 15 formed in the lid 14 while the outturned flange 18 of the grill rests on the upper face of the lid and is held in place by the pins 20 extending through the apertures 21 in the flange 18 of the grill. The lid 13 is provided with another aperture 23 normally closed by a cover 24.

When the cover 24 is removed pieces of butter may be inserted through the aperture 23 into the dish 12. A baffle plate 25 extends between the aperture 15 and the aperture 23 and is secured to the lower face of the lid 14 by means of the screws 26. It will be seen by reference to Fig. 3 that the lower edge of the baffle plate 25 does not quite contact the lower face of the dish 12. It will thus be seen that any butter that is inserted into the dish 12 through the aperture 23 must be in liquid condition before it can pass to the opposite side of the baffle plate 25. A cover 27 is provided, at the rear edge, with the lugs 28 for pivotally mounting the cover 27 upon a rod 29. The front end of the cover is provided with a downwardly extending flange 30. A U shaped member 31 is also mounted upon the rod 29 and is in spaced relation to the ends and front of the cover 27. A handle 32 is connected to the front of the U shaped member 31 and carries the pins 33, the same being forced toward the front of the cover 27 by means of the springs 34 positioned in the recesses 35 formed in the bosses 36, the same being formed integral with the U shaped member 31. The downturned flange 30 of the cover 27 is provided with the apertures 37 for receiving the rounded ends 38 of the pins 33. It will thus be seen that when the pins 33 engage in the apertures 37 in the downturned flange 30 of the cover 27, the cover 27 and the U shaped member 31 will move as a unit when the operator lifts or lowers the handle 32.

A stop pin 38' is threaded in the downturned flange 30 of the cover 27 and extends over the U shaped member 31 so that the U shaped member cannot be raised above the cover 27.

As best seen from Figs. 1 and 3 the plates 40, 41 and 42 are positioned below the cover 27 and are vertically movable in relation to the cover to accommodate for different thicknesses of bread or toast that may be placed upon the grill 16. The lower face of the cover 27 is provided approximately centrally thereof with the studs 43 while the cup shaped members 44 are secured to the upper face of the several plates 40, 41 and 42. The springs 45 encircle the studs 43 and rest within the cups 44 and the normal tendency of the springs is to keep the plates 40, 41 and 42 spaced from the cover 27. Suitable guide pins 46 are secured in each of the several plates 40, 41 and 42 and extend through suitable apertures in the cover 27, the apertures being of such construction as to permit the pins to be rocked therein and particularly from side to side so that in case a wedge shaped piece of bread or toast is placed upon the grill either one of the several plates 40, 41 or 42 positioned thereabove may have a face to face contact with the upper face of the same. The upper end of the pins 46 are provided with the enlarged heads 47 for limiting the movement of the plates 40, 41 and 42 away from the cover 27.

The rod 29 on which the cover 27 is mounted has its ends supported in suitable bearings 50, the same being secured to the lid 13 adjacent the ends thereof. The handles 51 are secured to the rod 29 at the extreme outer end thereof so that rotation of either handle will cause rotation of the rod. A pin 52 is secured in one of the handles and is provided at one end thereof with the spring pressed ball 53 for engaging in any one of a series of indents 54 provided in the segmental portion 55 formed integral with the bearing 50. An eccentric collar 56 is secured to the rod 29 by means of the pin 57, the collar 56 being positioned between the boss 28 and the bearing 50. A link 57' has one end provided with an aperture for encircling the collar 56 while the opposite end is connected by the pin 58 to a link 59. The opposite end of the link 59 is provided with an open ended arcuate slot 60 for engaging over a pin 61 extending from one face of a bell crank lever 62, the same being pivotally mounted at 63, to a bracket 64 secured to the lower face of the lid 13. The opposite end of the bell crank 62 is provided with a pin 64ª for engaging in a slot 65 provided in the bracket 66 secured to one end of the tray 67. A second bell crank lever 68 has the upper end pivoted at 69 to a bracket 70 secured to the lower face of the lid 13, while the opposite end of the same is provided with a pin 71 for engaging in a slot 72 in a bracket 73 secured to the tray 67.

A link 74 has one end pivotally connected to the bell crank 68 as indicated at 75 and has its other end connected at 76 to the bell crank 62. It will be understood that the same structure is used at both ends of the tray 67 so that both ends of the same will be lifted at the same time. When the U shaped member 31 carrying the cover 27 with it is in the raised position, as shown in Fig. 5, the notch 60 in the link 59 will engage the pin 61 and as the U shaped member 31 is swung downwardly the pin 61 will be moved toward the rear of the container and about the pivot point 63 and consequently the lower end of the bell cranks 62 and 68 will be raised and inasmuch as the tray 67 is connected to the bell crank the same will be raised. When the U shaped member has been completely lowered and has assumed the position shown in Fig. 3 the tray 67 will have been raised to its maximum limit or until the lower end of the flange 17, provided on the grill 16, abuts the bottom of the tray 67. It will be understood that the dish 12 will have a sufficient amount of melted butter therein so that the level of the same will be at a height greater than the depth of the tray 67, so that when the tray is lowered and assumes the position shown in Fig. 5, the same will be completely filled with melted butter. It will thus be seen that when the tray assumes the position, as shown in Fig. 3, that the piece of toast T will have its lower face coated with melted butter the depth to which it is applied being dependent upon the height to which the tray is raised in relation to the grill 16.

It will be seen by reference to Fig. 4 that the end 80 of the link 59, extending forwardly of the pivot point 58, will engage under the hub portion of the link 57 and thus the pin 61 will be permitted to disengage itself from the arcuate slot 60 when the tray has been fully raised. The tray will then fall by its own weight to the bottom of the dish 12 and the pin 61 will pass under the link 59 and assume its position in approximately vertical alignment with the pivot 63. When the U shaped member is again raised to the position shown in Fig. 5 the notch 60 will again engage over the pin 61 and upon the next lowering of the U shaped member 31 the tray will again be raised. By this arrangement it will be seen that even if the cover 27 is lowered onto the top of the toast and left there that the butter tray 67 will be only in momentary contact with the lower face of the toast. By rotating either of the handles 52 it will be seen that the lower face of the toast may be immersed in the butter tray 67 at varying depths as rotation of the handle will rotate the eccentric collar 56 secured to the rod 29 thus raising or lowering the pivot point 58 and thus consequently changing the height to which the tray 67 may be raised.

If it is desired to butter a roll of considerable thickness it is only necessary to lay the roll on the grill 16 and then disengage the handle 32 secured to the U shaped member 31 from the cover 27, as herebefore described, whereupon the U shaped member 31 may be lowered to an approximately horizontal position and allow the cover 27 to remain in the position it occupies in Fig. 5. As the U shaped member 31 is lowered it will raise the butter tray 67 as heretofore described and allow the lower face of the roll to have a film of melted butter applied thereto. A pair of angle brackets 90 are secured to the lower face of the lid 13 and extend into the dish 12 and they, combined with the plate 25, act as guides for guiding the movement of the tray 67 in its upward and downward movement. A switch 91 is secured to the front face of the member 8 and may be used for cutting the current off or on to the heating element 6.

From the foregoing description it becomes evident that I have provided a toast or bread buttering device in which a predetermined amount of butter may be applied to the face of the same and in which the time is limited in which the butter tray may be kept in contact with the toast or bread to be buttered and further that due to the adjustment of the leverage which raises and lowers the tray the depth to which the toast may be immersed in the butter may be varied as desired and also pieces of toast or bread of varying thickness may be buttered at the same time and the same amount of butter applied to each slice of toast.

Having thus fully described my invention, its utility and mode of operation, what I claim and desire to secure by Letters Patent of the United States is—

1. In apparatus of the character described, a grid like element for the support of a piece of toast or the like, a receptacle for melted butter positioned below the grid like element, a tray positioned below the grid like element and vertically movable in the receptacle, means for moving the tray to bring the butter therein into contact with the toast on the grid and means for immediately releasing the tray to movement by gravity away from the grid like element when the butter in the tray has been brought into momentary contact with the piece of toast upon the grid.

2. In apparatus of the character described, a grid like element for the support of a piece of toast or the like, a receptacle for melted butter positioned below the grid like element, a tray positioned below the grid like element and vertically movable in the receptacle, means for moving the tray to bring the butter therein into contact with the toast on the grid, means for immediately releasing the tray to movement by gravity away from the grid like element when the butter in the tray has been brought into momentary contact with the piece of toast upon the grid, and means for adjusting the amount of movement of the tray toward the grid like element.

3. In apparatus of the character described, a grid like element for the support of a piece of toast or the like, a receptacle for melted butter positioned below the grid like element, a tray positioned below the grid like element and vertically movable in the receptacle, means for moving the tray to bring the butter therein into contact with the toast on the grid, means for releasing the tray at the time it reaches its uppermost position to fall by gravity into the butter, a plate positioned above the grid like element, for resting upon the upper face of a piece of toast upon the grid, means for applying pressure to the same so that the face of the toast upon the grid will be flattened out, and means for adjusting the extent of movement of the tray toward the grid like element.

4. In apparatus of the character described, a grid like element for the support of a piece of toast or the like, a receptacle for melted butter positioned below the grid like element, a tray positioned below the grid like element and vertically movable in the receptacle, means for moving the tray to bring the butter therein into contact with the toast on the grid, means for releasing the tray at the time it reaches its uppermost position to fall by gravity into the butter and means for adjusting the extent of movement of the tray toward the grid like element.

5. In apparatus of the character described, a grid like element for the support of a piece of toast or the like, a receptacle for melted butter positioned below the grid like element, a tray positioned below the grid like element and vertically movable in the receptacle, means for moving the tray to bring the butter therein into contact with the toast on the grid, a plate positioned above the grid like element for resting upon the upper face of a piece of toast upon the grid, means for applying pressure to the same so that the face of the toast upon the grid will be flattened out, and means for immediately releasing the tray to movement by gravity away from the grid like element when the butter in the tray has been brought into momentary contact with the piece of toast upon the grid.

6. In apparatus of the character described, a grid like element for the support of a piece of toast or the like, a receptacle for melted butter positioned below the grid like element, a tray position below the grid like element and vertically movable in the receptacle, means for moving the tray to bring the butter therein into contact with the toast on the grid, a plate positioned above the grid like element for resting upon the upper face of a piece of toast upon the grid, means for applying pressure to the same so that the face of the toast upon the grid will be flattened out, means for immediately releasing the tray to movement by gravity away from the grid like element when the butter in the tray has been brought into momentary contact with the piece of toast upon the grid, and means for adjusting the amount of movement of the tray toward the grid like element.

7. In apparatus of the character described, a grid like element for the support of a piece of toast or the like, a receptacle for melted butter positioned below the grid like element, a tray positioned below the grid like element and vertically movable in the receptacle, a pivoted cover positioned above the grid like element, a U shaped member in spaced relation to the edge of the cover, and means for engaging or disengaging the U shaped member from the cover.

8. In apparatus of the character described, a grid like element for the support of a piece of toast or the like, a receptacle for melted butter positioned below the grid like element, a tray positioned below the grid like element, a pivoted cover positioned above the grid like element, a U shaped member in spaced relation to the edge of the cover, means for engaging or disengaging the U shaped member from the cover, and leverage means operable by the U shaped member for raising the tray so that the butter therein will contact the lower face of the piece of toast on the grid.

9. In apparatus of the character described, a grid like element for the support of a piece of toast or the like, a receptacle for melted butter positioned below the grid like element, a tray positioned below the grid like element, a pivoted cover positioned above the grid like element, a U shaped member in spaced relation to the edge of the cover, means for engaging or disengaging the U shaped member from the cover, leverage means operable by the U shaped member for raising the tray so that the butter therein will contact the lower face of the piece of toast on the grid, and means for adjusting the amount of movement of the tray toward the grid like element.

10. In apparatus of the character described, a grid like element for the support of a piece of toast or the like, a receptacle for melted butter positioned below the grid element, a tray positioned in the receptacle below the grid like element, means for moving the tray to bring melted butter therein to contact with the surface of the toast, and means for automatically releasing the tray to drop by gravity away from the toast approximately at the time the tray reaches toast contacting position.

In testimony whereof I sign this specification.

ROBERT R. DICKERSON.